United States Patent
Curtis et al.

(10) Patent No.: US 8,968,067 B1
(45) Date of Patent: Mar. 3, 2015

(54) PROVIDING PERSONALIZED LEADERBOARDS TO USERS OF A GAME

(71) Applicants: Matthew Curtis, Novato, CA (US); James Koh, Mountain View, CA (US); Kellen Christopher Smalley, Pleasanton, CA (US); Michael C. Caldarone, Palo Alto, CA (US)

(72) Inventors: Matthew Curtis, Novato, CA (US); James Koh, Mountain View, CA (US); Kellen Christopher Smalley, Pleasanton, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 61 days.

(21) Appl. No.: 13/861,240

(22) Filed: Apr. 11, 2013

(51) Int. Cl.
*A63F 9/24* (2006.01)
*A63F 13/30* (2014.01)

(52) U.S. Cl.
CPC ...................... *A63F 13/12* (2013.01)
USPC .......... 463/6; 463/9; 463/29; 463/39; 463/40; 463/42

(58) Field of Classification Search
CPC ....... G06Q 50/34; G06Q 10/00; G06Q 10/10; G06Q 20/027; G06Q 30/0222; G06Q 30/0236; G06Q 30/0258; G06Q 30/0601; G06Q 30/0643; G06Q 99/00; H04L 67/38; H04L 12/2876; H04L 29/06; H04L 29/06027; H04L 29/08846; H04L 63/083; H04L 63/102; H04L 67/104; H04L 67/1046; H04L 67/1093; H04L 67/14; H04L 67/24; H04L 67/28; H04L 67/306; A63F 13/12; A63F 2300/558; A63F 13/10; A63F 2300/61; A63F 2300/407; A63F 2300/538; A63F 2300/5546; A63F 2300/556; A63F 2300/5566; A63F 2300/577; A63F 2300/204; A63F 2300/308; A63F 2300/406

See application file for complete search history.

(56) References Cited

U.S. PATENT DOCUMENTS

| | | | |
|---|---|---|---|
| 7,050,868 B1 | 5/2006 | Graepel | 700/93 |
| 7,813,821 B1 * | 10/2010 | Howell | 700/91 |
| 8,272,951 B2 | 9/2012 | Ganz | 463/29 |
| 8,332,544 B1 | 12/2012 | Ralls | 710/8 |
| 8,388,427 B2 | 3/2013 | Yariv | 463/9 |
| 8,583,266 B2 * | 11/2013 | Herbrich et al. | 700/93 |
| 8,784,214 B2 * | 7/2014 | Parks et al. | 463/42 |
| 2002/0115488 A1 * | 8/2002 | Berry et al. | 463/42 |
| 2004/0225387 A1 * | 11/2004 | Smith, III | 700/92 |
| 2006/0217198 A1 * | 9/2006 | Johnson | 463/40 |
| 2011/0065511 A1 | 3/2011 | Mahan | 463/40 |
| 2012/0034961 A1 * | 2/2012 | Berman et al. | 463/6 |
| 2012/0311504 A1 * | 12/2012 | van Os et al. | 715/853 |
| 2012/0322561 A1 | 12/2012 | Kohlhoff | 463/42 |
| 2013/0151342 A1 * | 6/2013 | Citron et al. | 705/14.64 |

\* cited by examiner

*Primary Examiner* — Sunit Pandya
(74) *Attorney, Agent, or Firm* — Pillsbury Winthrop Shaw Pittman LLP (57) ABSTRACT

An approach to facilitate providing personalized leaderboards based upon user parameters, game parameters or a combination thereof. The personalized leaderboard determined by identifying a group of users (i) to which the first user belongs, and (ii) among which performance in the online game by the first user as characterized by the first set of game parameter values is relatively high. Providing leaderboards where the user features relatively high incentivizes the user to continue playing the game to continue progressing toward the top of the leaderboard, improving player retention.

20 Claims, 5 Drawing Sheets

200~# PROVIDING PERSONALIZED LEADERBOARDS TO USERS OF A GAME

FIELD OF THE DISCLOSURE

This disclosure relates to providing leaderboards in online games, in particular providing personalized leaderboards to users of a game based on user characteristics.

BACKGROUND

Leaderboards for games are known. Previously, leaderboards have been used to represent the high score of all users playing a game. The games usually have a single leaderboard viewable by every player within the game, such that only the players with the highest overall game scores feature on the leaderboard. Leaderboards often tend to be static, presenting the hierarchy of one measureable element of the game, usually overall game score, within the game.

SUMMARY

One aspect of the disclosure relates to providing users with personalized leaderboards based upon user characteristics. Personalized leaderboards may be provided to a user that are determined based upon user parameters for the user, game parameters for the user, or a combination thereof. It has been found that providing personalized leaderboards to users of games where the leaderboard has been determined to feature the user relatively high, encourages the user to continue playing the game so that they may progress up the leaderboard. Featuring a player relatively high on a leaderboard provides them with the reassurance that they are relatively good at the game, or at an aspect of the game. Making users feel good about their game experience and gaming skills, encourages users to continue playing a game, improving player retention and increasing the possible revenue to be derived from the player.

A game may have many leaderboards associated with different parameters within the game. For example, the game may have one or more objectives and/or quests, and may provide, to the user, a leaderboard associated with individual ones of the objectives and/or quests. Leaderboards may be provided to a user for one or more game parameters, such as total experience points, skill level, number of player-versus-player kills, distance travelled by the user's character within the game, and/or other game parameters. The leaderboards may display the hierarchy of individual users with respect to other users as associated with objectives, quests, game parameters, and/or other criteria. Leaderboards may represent every user playing a game, and/or leaderboards may represent an identified group of users. An identified group of users may be associated with the user to which the personalized leaderboard is presented. Identified group of users may be selected for a leaderboard to be presented to a first user based on a determination that the first user features relatively high on the leaderboard comprised of the identified group of users.

A user of a game presented with a leaderboard at which they are closer to the top may be incentivized to continue playing. The player may feel encouraged by learning that they are relatively accomplished at completing a specific task, as compared to other players. Indications of rewards may be presented to incentivize game play by the user. Leaderboards, wherein the user appears at a relatively high position, may be determined for a user based upon one or more user parameters, one or more game parameters, and/or a combination of user parameters and game parameters. A group of users may be identified to be included in the leaderboard based on a determination that the user, to which the leaderboard is presented, belongs to the group. A group of users may be identified to be featured in a leaderboard presented to a first user, based upon one or more user parameters for the first user, such that the first user has a relatively high set of game parameter values compared to the group of users.

The group of users may be selected such that, for the first user's leaderboard where the first user features relatively high on the leaderboard, the first user is below the top of the leaderboard. Providing a leaderboard where the user is relatively high within the leaderboard, but fails to reach the top, may incentivize the user to continue playing in the hope that the user may continue to progress toward the top of the leaderboard. Encouragement may be derived from the recognition that the user is relatively accomplished at an action, or objective related to the presented leaderboard. The leaderboard may be determined upon an indication that one or more game parameters or one or more user parameters have been modified in response to an interaction by the first user with the game environment. As such, the parameters used to determine the leaderboard presented to the first user may change over time, causing the leaderboards to adjust and change over time.

The leaderboard, to be presented to the first user, may be determined based upon one or more game parameters, where there is an indication that the first user has relatively high game parameter values compared to a group of users.

The system for providing personalized leaderboards to users may include one or more servers. The server(s) may be configured to communicate with one or more client computing platforms according to a client/server architecture. The users may access the system via the client computing platforms. Client computing platforms may include, but not be limited to, personal computers, laptops, and/or handheld devices such as smartphones, tablets, and PDAs. The server(s) may be configured to communicate with the one or more client computing platforms through a network, such as the Internet. Web servers may be utilized to facilitate communication between the server(s) and the client computing platforms, where web servers host one or more websites associated with the online game.

The server(s) may be configured to execute one or more computer program modules to facilitate providing leaderboards to users based on in-game events. The computer program modules may include one or more of a game module, a user module, a leaderboard determination module, a leaderboard presentation module and/or other modules. In some implementations, the client computing platforms may be configured to execute one or more computer program modules that are the same as or similar to the computer program modules of the server(s) to facilitate providing leaderboards to users based on in-game events.

The game module may be configured to execute an instance of an online game. The game module may be configured to implement the instance of the online game to facilitate interaction of the users with the game. The game module may be configured to execute an instance of a virtual environment, in which the online game may be implemented. The game module may be configured to facilitate presentation of the virtual environment to the user. The game module may be configured to facilitate interaction of the users with the online game by executing actions in the instance of the online game in response to receiving action requests from the users. In other implementations, the game module may be configured to execute an instance of a two-dimensional online game, whereby users interact with the two-dimensional game through the client computing platforms.

The user account module may be configured to manage accounts of the users. The accounts of the user may include a first user account associated with a first user. The first user account may indicate a first set of user parameter values for the first user, and a first set of game parameter values for the first user. The first set of user parameter values may be representative of the first user, and the first set of game parameter values may characterize performance of the first user in the online game.

User parameters may relate to, characterize, and/or describe one or more of user characteristics, user demographics, user traits, and/or other user information. User parameters may include user type. The user may be a collection or harvesting type user where the user indicates a preference for collecting, cultivating, of manufacturing a particular resource or collection of resources. The user may be a player-versus-player type user, where the user indicates a preference for competing with other users within the game. The user may be a player versus environment type payer, where the user indicates a preference for competing in quests, or defeating non-player characters. Such user types may be selected by the user or may be determined based at least in part of the frequency with which users perform certain in-game actions or types of in-game actions. User parameters may include one or more user demographics, such as gender, age, education level, regional location, or other demographic information. User parameters may include an indication of electronic social media and/or social network associations, and other users, or friends, to which a user may be associated with through electronic social media and/or social networks. User parameters may include an indication of alliances, guilds, or other groups within the game to which the user may be affiliated. Other examples of user parameters are contemplated.

Game parameters may include, indicate, quantify, and/or represent progress and/or achievement by the user within one or more aspects of the game. For example, game parameters may include overall experience points or score of the user within the game. Game parameters may include skill points relating to various acquirable skills within the game, such as mining, strength, defense, attack, blacksmithing, and/or other acquirable skills. Game parameters may include the amount of virtual currency purchased by the user and/or held by the user. Other examples of game parameters are contemplated.

The leaderboard determination module may be configured to determine a leaderboard for presentation to the first user. The determination may include identifying a group of users (i) to which the first user belongs, and (ii) among which performance in the online game by the first user as characterized by the first set of game parameter values is relatively high. The personalized leaderboard for the first user may be determined based upon a first set of user parameters, a first set of game parameters, a first group of users among which the first user belongs, or a combination thereof. Determination of whether the first user belongs to a group of users, to feature on the personalized leaderboard to be presented to the first user, may be based upon one or more user parameters.

The group of users may be identified among which performance in the online game by the first user, as characterized by the first set of game parameter values, is greater than a determined threshold of success. The determined threshold of success may be a specified position below the most successful user in the group. The determined threshold of success may be within a specified percentile of the most successful user in the group. The group of users may be associated with the first user, may be based on one or more user parameters for the first user, or may be determined based on other metrics associated with the game, to provide a leaderboard where the first user appears to have a relatively high level of success compared to the group of users.

The leaderboard determination module may determine a leaderboard for the first user based upon a first set of game parameters, wherein the leaderboard to be presented to the first user displays an indication of a relative success of the first user in actions associated with the first set of game parameters. Therefore, the indicated success of the first user may be associated with one game parameter value, or a combination of game parameter values, determined to ensure that the first user features relatively high in the personalized leaderboard for the first user.

The leaderboard presentation module may be configured to effectuate presentation to the first user of the leaderboard determined by the leaderboard determination module. The first set of user parameters and the first set of game parameters for the first user, may be different than a second set of user parameters and a second set of game parameters for the second user. Therefore, the leaderboard presented to a first user may be different to the leaderboard presented to a second user.

The first user may have a first set of game parameter values less than at least one user of the identified group of users. The first set of game parameters, the identified group of users, or a combination thereof, may be determined such that the first user has a relatively high first set of game parameter value compared to the identified group of users, but fails to continue to progress toward the top of the leaderboard. By providing a leaderboard where the first user is close to, but fails to continue to progress toward the top of the leaderboard, incentivizes the user to continue playing the game, and/or particular activity within the game, to try to continue to progress toward the top of the leaderboard.

The leaderboard may be determined, in whole or in part, by identifying a group of users among which performance in the online game by the first user, as characterized by one or more major game parameter values of the first set of game parameters, is relatively high. In some implementations, the major game parameters of the first user may be determined for the first user based on one or more user parameter values for the first user. Where the performance of the first user, as characterized by one or more major game parameter values, is not relatively high compared to the identified group of users, users may be selectively removed, and/or replaced, from the identified group of users until the first user has major game parameter values that feature relatively high.

The one or more major game parameters may be determined based upon the first set of user parameters for the first user. Major game parameters may be game parameters defined by an administrator. For example, major game parameters may be defined as total experience points of the first user, the total might of the user, the total kills of the user, and/or other game parameters selected by the administrators. Major game parameters may be based on the user type. Where the user is a collection or harvesting type user, game parameters associated with collection and/or harvesting may be selected as major game parameters. Where the user is a player-versus-player type user, game parameters associated with player-versus-player activities, such as number of player-character kills, may be selected as major game parameters. Where the user is a player-versus-environment type payer, game parameters associated with player-versus-environment activities, such as total number of quests completed, may be selected as major game parameters.

Major game parameters may be determined based upon a user's game playing history. For example, the user account for the user may indicate that the user has a preference for hunting and for player-versus-player activities. One of more game parameters may be selected to be major game parameters for the user. Major game parameters may be selected that are associated with the purchase of in-game items using real currency. Leaderboards may be presented to the user featuring the user's relative success, compared to a group of users, based upon a major game parameter which may be improved by the purchase of virtual currency by the user. Game parameters effected by the purchase of virtual currency, may be the total amount of virtual currency purchased by the user, the total amount of virtual currency held by the user, the level of items held by the user that can only be purchased from a game shop.

The selection of the group of users to which the first user belongs may be based upon one or more user parameter values of the first set of user parameter values. The one or more user parameter values upon which the selection of the group is based, may include user demographics. User demographics may include gender, age, location, weather, or any other identifying parameter for the user. The first set of user parameter values may include an indication of one or more collections of users to which the first user belongs. Collections of users may include in-game alliances, guilds or associations. Collections of users may include user whose in-game characters cohabitate a similar location within the game environment, have a particular character or user type, or users that have progressed to a particular hierarchy within the game. Collections of users may include users that have purchased above a threshold amount of virtual currency, or that have above a threshold amount of virtual currency in their inventories.

The selection of the group of users to which the first user belongs may be based on an indication that the first user has a relatively high first set of game parameter values, or a relatively high indication of success associated with the first set of game parameter values, compared to those of the users within the selected group. The group of users may be otherwise unrelated to the first user. The leaderboard, presented to the first user, presenting an indication of success based upon one or more game parameter values for the first user, may feature the first user relatively high.

Individual ones of the one or more user parameter values may indicate that the first user, belongs to a particular alliance, guild, or association within the game, has electronic social media associations with one or more other users of the game, is affiliated with one or more real-world organizations, is located in a defined geographic region. Users may be selected for inclusion into the group of users to feature on the leaderboards based on their common association with the first user's in-game alliance, guild, or association, the first user's real-world organizations, geographic location, and/or is affiliated with the first user through one or more electronic social media.

The motivational module may be configured to effectuate presentation to the first user of a motivational message, wherein the motivational message comprises an indication of the first set of game parameters. The motivational message may provide an indication that the user is near to the top position on the leaderboard and/or has relatively high first set of game parameter values compared to the identified group of users. The motivational module may be configured to effectuate presentation to the first user of one or more incentives for achieving a relatively high first set of game parameters compared to the identified group of users.

Incentives may be presented to users indicating the user will obtain the incentive upon the user achieving above a defined threshold of a game parameter value when compared to the game parameter values of an identified group of users. Such incentives may include one or more of virtual items, other amounts of virtual currency, access to areas in the game space that were previously not accessible to the first user, quests in the game space that were previously not available to the first user and/or other incentives to incentivize the first user to keep striving to achieve the objective, complete the activity or perform the action.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
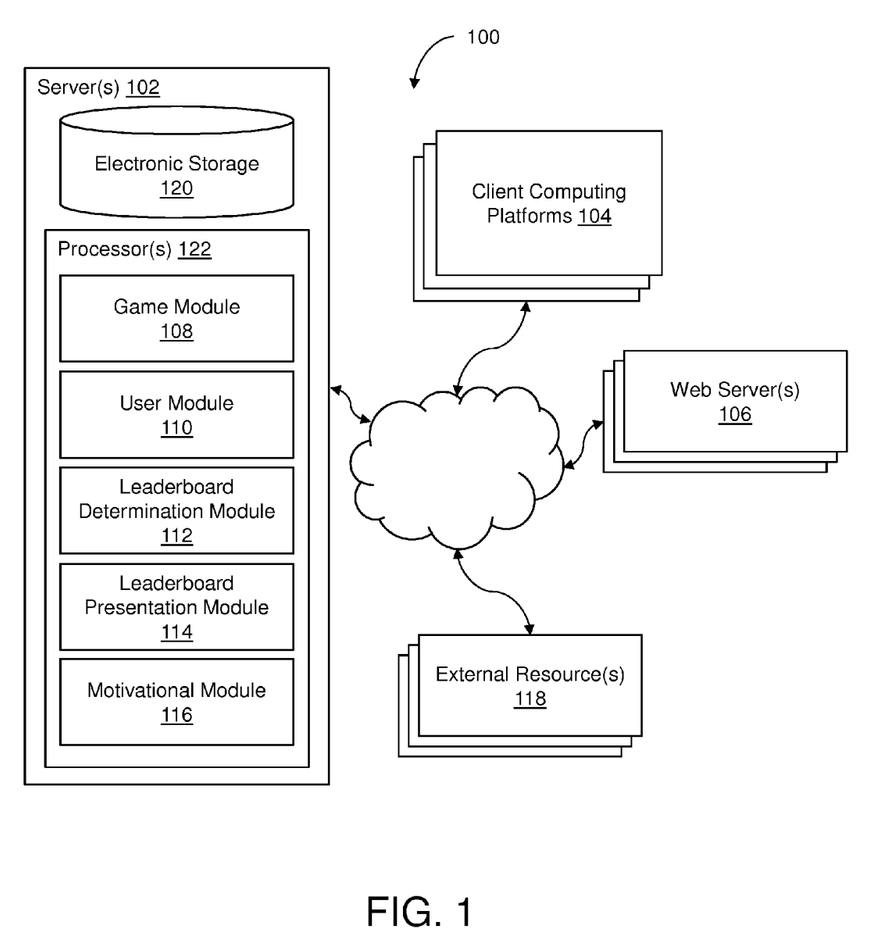
FIG. 1 illustrates a system configured to facilitate providing personalized leaderboards to users, in accordance with one or more implementations.

FIG. 1 illustrates a system 100 configured to facilitate providing personalized leaderboards to users, in accordance with one or more implementations. A game may have many leaderboards associated with different parameters within the game. For example, the game may have one or more objectives and/or quests, and may provide, to the user, a leaderboard associated with individual ones of the objectives and/or quests. Leaderboards may be provided to a user for one or more game parameters, such as total experience points, skill level, number of player-versus-player kills, distance travelled by the user's character within the game, and/or other game parameters. The leaderboards may display the hierarchy of individual users with respect to other users as associated with objectives, quests, game parameters, and/or other criteria. Leaderboards may represent every user playing a game. Leaderboards may represent an identified group of users. An identified group of users may be associated with the user to which the personalized leaderboard is presented. Identified group of users may be selected for a leaderboard to be presented to a first user based on a determination that the first user features relatively high on the leaderboard comprised of the identified group of users.

A user of a game presented with a leaderboard at which they are closer to the top of may be incentivized to continue playing in the hope of reaching the top of the leaderboard.

Indications of rewards may be presented to incentivize game play by the user. Leaderboards may be presented to the user wherein the user appears at a relatively high position on the leaderboard. Leaderboards may be determined for a user based upon one or more user parameters, one or more game parameters, and/or a combination of user parameters and game parameters. A group of users may be identified to be included in the leaderboard based on a determination that the user, to which the leaderboard is presented, belongs to the group. A group of users may be identified to be featured in a leaderboard presented to a first user, based upon one or more user parameters for the first user, such that the first user has a relatively high set of game parameter values compared to the group of users.

Leaderboards may be provided to a user comprising an identified group of users among which the user features relatively high on the leaderboard. The group of users may be selected for the first user's leaderboard, where the first user features relatively high on the leaderboard, but is not at the top of the leaderboard. By providing a leaderboard where the user is relatively high within the leaderboard, but fails to reach the top, the user may be incentivized to continue playing in the hope that the user may continue to progress toward the top of the leaderboard. The leaderboard may be determined upon an indication that one or more game parameters or one or more user parameters have been modified in response to an interaction by the first user with the game environment. As such, the parameters used to determine the leaderboard presented to the first user may change over time, causing the leaderboards to adjust and change over time.

The system 100 for providing personalized leaderboards to users may include one or more servers 102. The server(s) 102 may be configured to communicate with one or more client computing platforms 104 according to a client/server architecture. The users may access the system 100 via the client computing platforms 104. Client computing platforms 104 may include, but not be limited to, personal computers, laptops, and/or handheld devices such as smartphones, tablets, and PDAs. The server(s) 102 may be configured to communicate with the one or more client computing platforms 104 through a network, such as the Internet. Web servers 106 may be utilized to facilitate communication between the server(s) 102 and the client computing platforms 104, where web servers 106 may host one or more websites associated with the online game. The server(s) 102 may communicate with the client computing platform(s) 104 and/or web server(s) 106 through a network, such as the Internet. In some implementations, the server(s) 102 may include the web server(s) 106.

The server(s) 100 may be configured to execute one or more computer program modules to facilitate providing leaderboards to users based on in-game events. The computer program modules may include one or more of a game module 108, a user module 110, a leaderboard determination module 112, a leaderboard presentation module 114, a motivational module 116, and/or other modules. In some implementations, the client computing platforms 104 may be configured to execute one or more computer program modules that are the same as or similar to the computer program modules of the server(s) 102 to facilitate providing leaderboards to users based on in-game events.

A given client computing platform 104 may include one or more processors configured to execute computer program modules. The computer program modules may be configured to enable an expert or user associated with the given client computing platform 104 to interface with system 100, web servers 106, and/or external resources 118, and/or provide other functionality attributed herein to client computing platforms 104. By way of non-limiting example, the given client computing platform 106 may include one or more of a desktop computer, a laptop computer, a handheld computer, a tablet computing platform, a NetBook, a Smartphone, a gaming console, and/or other computing platforms.

The external resources 118 may include sources of information, hosts and/or providers of virtual environments outside of system 100, external entities participating with system 100, and/or other resources. In some implementations, some or all of the functionality attributed herein to external resources 100 may be provided by resources included in system 100.

The server(s) 102 may include electronic storage 120, one or more processors 122, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise electronic storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor 120, information received from server(s) 102, information received from client computing platforms 104, and/or other information that enables server(s) 102 to function as described herein.

Processor(s) 122 is configured to provide information processing capabilities in server(s) 102. As such, processor(s) 102 may include one or more of a digital processor, an analog processor, a digital circuit designed to process information, an analog circuit designed to process information, a state machine, and/or other mechanisms for electronically processing information. Although processor x is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. The processor(s) 122 may be configured to execute modules 108, 110, 112, 114, 116, and/or other modules. Processor(s) 122 may be configured to execute modules 108, 110, 112, 114, 116, and/or other modules by software; hardware; firmware; some combination of software, hardware, and/or firmware; and/or other mechanisms for configuring processing capabilities on processor(s) 122.

It should be appreciated that although modules 108, 110, 112, 114, and 116 are illustrated in FIG. 1 as being co-located within a single processing unit, in implementations in which processor(s) 124 includes multiple processing units, one or more of modules 108, 110, 112, 114, 116, and/or other modules may be located remotely from the other modules. The description of the functionality provided by the different modules 108, 110, 112, 114, 116, and/or other modules described below is for illustrative purposes, and is not intended to be limiting, as any of modules 108, 110, 112, 114, 116, and/or other modules may provide more or less functionality than is described. For example, one or more of modules 108, 110, 112, 114, 116, and/or other modules may be eliminated, and some or all of its functionality may be provided by other ones of modules 108, 110, 112, 114, 116, and/or other modules. As another example, processor 122 may be configured to execute one or more additional modules that may perform some or all of the functionality attributed below to one of modules 108, 110, 112, 114, 116, and/or other modules.

The game module 108 may be configured to execute an instance of an online game. The game module 108 may be configured to implement the instance of the online game to facilitate interaction of the users with the game. The game module 108 may be configured execute an instance of a virtual space, in which the online game is implemented. The game module 108 may be configured to facilitate presentation of the virtual environment to the user. The game module 108 may be configured to facilitate interaction of the users with the online game by executing actions in the instance of the online game in response to receiving action requests from the users. In other implementations, the game module 108 may be configured to execute an instance of a two-dimensional online game, whereby users interact with the two-dimensional game using the client computing platforms 104.

The game module 108 may be configured to provide one or more virtual environments to users via client computing platforms 104. As used herein, a "virtual environment" may include a virtual space, one or more interactive, electronic social media, and/or other virtual environments.

A virtual environment may comprise a simulated space that is accessible by users via clients (e.g., client computing platforms 104) that present the views of the virtual environment to a user. Web servers 106 may be used to provide a virtual environment to the users, where the web servers 106 are in operable communication with the client computing platforms 104 and server(s) 102. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space/environment are determined by game module 108 is not intended to be limiting. The game module 108 may be configured to express the virtual environment in a more limited, or more rich, manner. For example, views determined for the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 108, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. The user character may be controlled by the user with which it is associated. The user controlled element(s) may move through and interact with the virtual environment (e.g., non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through client computing platforms 104. The users may interact with each other through communications exchanged within the virtual environment. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through game module 108).

Interactive, electronic social media may include one or more of a social network, a virtual environment, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The user account module 110 may be configured to manage accounts of the users. The accounts of the user may include a first user account associated with a first user. The first user account may indicate a first set of user parameter values for the first user, and a first set of game parameter values for the first user. The first set of user parameter values may be representative of the first user, and the first set of game parameter values may characterize performance of the first user in the online game.

User parameters may relate to, characterize, and/or describe one or more of user characteristics, user demographics, user traits and/or other user information. User parameters may include user type. The user may be a collection or harvesting type user where the user indicates a preference for collecting, cultivating, of manufacturing a particular resource or collection of resources. The user may be a player-versus-player type user, where the user indicates a preference for competing with other users within the game. The user may be a player versus environment type payer, where the user indicates a preference for competing in quests, or defeating non-player characters. Such user types may be selected by the user or may be determined based at least in part of the frequency with which users perform certain in-game actions or types of in-game actions. User parameters may include one or more user demographics, such as gender, age, education level, regional location, or other demographic information. User parameters may include an indication of electronic social media and/or social network associations, and other users or friends to which a user may be associated with through electronic social media and/or social networks. User parameters may include an indication of alliances, guilds, or other groups within the game to which the user may be affiliated. Other examples of user parameters are contemplated.

Game parameters may include, indicate, quantify, and/or represent progress and/or achievement by the user within one or more aspects of the game. For example, game parameters may include overall experience points or score of the user within the game. Game parameters may include skill points relating to various acquirable skills within the game, such as mining, strength, defense, attack, blacksmithing, and/or other acquirable skills. Game parameters may include the amount of virtual currency purchased by the user and/or held by the user. Other examples of game parameters are contemplated. The leaderboard determination module 112 may be configured to determine a leaderboard for presentation to the first user. The determination may include identifying a group of users (i) to which the first user belongs, and (ii) among which performance in the online game by the first user as characterized by the first set of game parameter values is relatively high. The personalized leaderboard for the first user may be determined based upon a first set of user parameters, a first set of game parameters, a first group of users among which the first user belongs, or a combination thereof. Determination of whether the first user belongs to a group of users, to feature on the personalized leaderboard to be presented to the first user, may be based upon one or more user parameters.

The group of users may be identified among which performance in the online game by the first user, as characterized by the first set of game parameter values, is greater than a determined threshold of success. The determined threshold of success may be a specified position below the most successful user in the group. The determined threshold of success may be within a specified percentile of the most successful user in the group. The group of users may be associated with the first user, may be based on one or more user parameters for the first user, or may be determined based on other metrics associated with the game, to provide a leaderboard where the first user appears to have a relatively high level of success compared to the group of users.

The leaderboard determination module 112 may determine a leaderboard for the first user based upon a first set of game parameters, wherein the leaderboard to be presented to the first user displays an indication of a relative success of the first user in actions associated with the first set of game parameters. Therefore, the indicated success of the first user may be associated with one game parameter value, or a combination of game parameter values, determined to ensure that the first user features relatively high in the personalized leaderboard for the first user.

The leaderboard presentation 114 module may be configured to effectuate presentation to the first user of the leaderboard determined by the leaderboard determination module 112. The first set of user parameters and the first set of game parameters for the first user, may be different than a second set of user parameters and a second set of game parameters for the second user. Therefore, the leaderboard presented to a first user may be different to the leaderboard presented to a second user.

Figure 2:
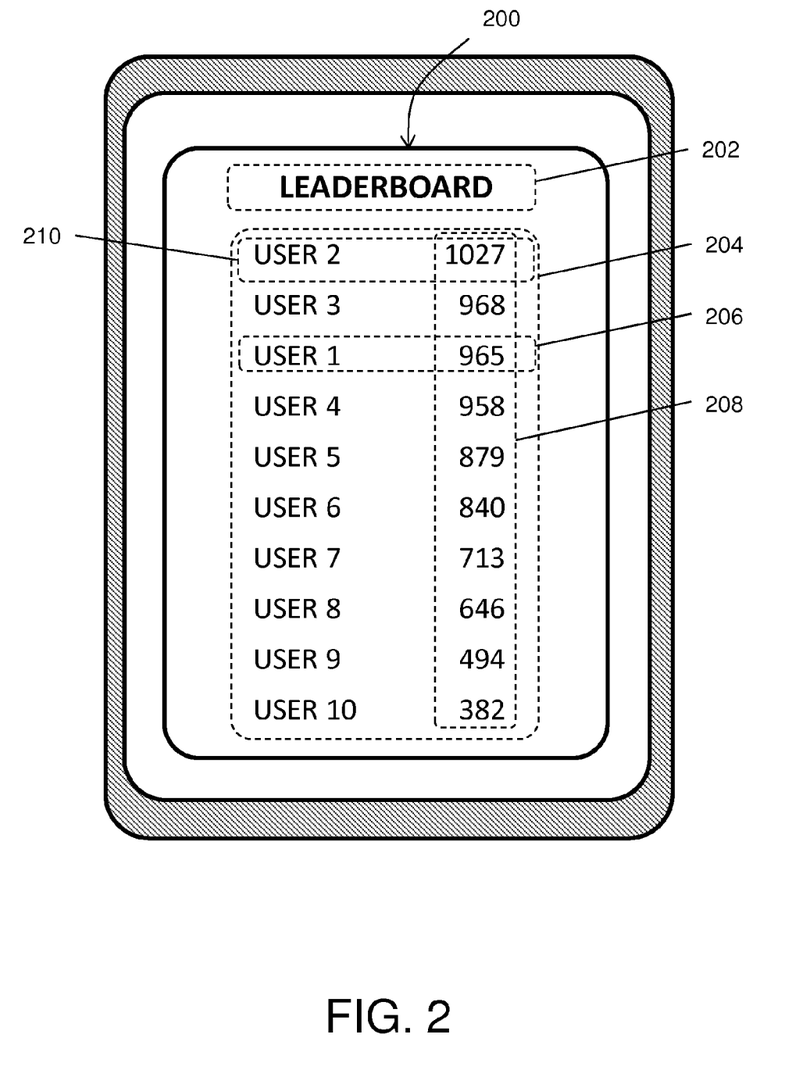
FIG. 2 illustrates a personalized leaderboard presented to a first user, in accordance with one or more implementations.

FIG. 2 illustrates a personalized leaderboard 200 presented to a first user, in accordance with one or more implementations. The leaderboard 200 may comprise a title 202 providing an indication of the first set of game parameters to which the leaderboard relates. Having a title 202 providing an indication of the first set of game parameters may incentivize the user to concentrate their gaming efforts on improving one or more game parameters in the first set of game parameters. The first set of game parameters indicated by the title 202 may include game parameters which are most effectively enhanced, either directly or indirectly, by the purchase of virtual currency and/or virtual items from the game shop. By incentivizing the user to concentrate their gaming efforts on improving such game parameters increases the possible monetization of the user. In other implementations, the leaderboard 200 may be presented to the user without an indication of the first set of game parameters to which it relates.

The leaderboard 200 may feature a group of users 204 identified based upon a determination that the first user belongs with the group 204, and among which performance in the online game by the first user 206, as characterized by the first set of game parameters, is relatively high. The leaderboard 200 may comprise the scores 206 of the group of users. The scores 206 indicating the first set of game parameter values for individual ones of the group of users 204, where the first set of game parameter values comprises one or more game parameter values for the users.

The group of users 204 may be identified among which the first user score 206 is greater than a defined threshold. The defined threshold may be having a user score greater than half of the users of the group of users 204. The defined threshold may be having a user score within a specified percentile of the top user score 210 on leaderboard 200. The defined threshold may be having a rank within a specified number from the user having the top user score 210.

The first user may have a first set of game parameter values lower than at least one user of the identified group of users. The first set of game parameters, the identified group of users, or a combination thereof, may be determined such that the first user has a relatively high first set of game parameters compared to the identified group of users, but fails to reach the top of the leaderboard. By providing a leaderboard 200 where the first user is close to, but fails to reach the top of the leaderboard 200, the first user s incentivized to continue playing the game, and/or particular activity within the game, to try to continue to progress toward the top of the leaderboard. Encouraging and incentivizing players to continue playing the game improves player retention of the game, and, therefore, improves the monetization of the player.

The group of users 204 may be identified among which performance in the online game by the first user as characterized by one or more major game parameters of the first set of game parameters is relatively high. In some implementations, the major game parameters of the first user may be determined for the first user based on one or more user parameter values for the first user. Users may be selectively removed from the group of users identified for inclusion on the leaderboard 200 for the first user, until the first user has relatively high major game parameters compared to the group of users.

The one or more major game parameters may be determined based upon the first set of user parameters for the first user. Major game parameters may be game parameters defined by an administrator. For example, major game parameters may be defined as total experience points of the first user, the total might of the user, the total kills of the user, and/or other game parameters selected by the administrators. Major game parameters may be based on the user type. Where the user is a collection or harvesting type user, game parameters associated with collection and/or harvesting may be selected as major game parameters. Where the user is a player-versus-player type user, game parameters associated with player-versus-player activities, such as number of player-character kills, may be selected as major game parameters. Where the user is a player-versus-environment type payer, game parameters associated with player-versus-environment activities, such as total number of quests completed, may be selected as major game parameters.

Major game parameters may be determined based upon a user's game playing history. For example, the user account for the user may indicate that the user has a preference for hunting and for player-versus-player activities. One of more game parameters may be selected to be major game parameters for the user. Major game parameters may be selected that are associated with the purchase of in-game items using real currency. Leaderboards 200 may be presented to the user featuring the user's relative success, compared to a group of users, based upon a major game parameter which may be improved by the purchase of virtual currency by the user. Game parameters effected by the purchase of virtual currency, may be the total amount of virtual currency purchased by the user, the total amount of virtual currency held by the user, the level of items held by the user that can only be purchased from a game shop.

The selection of the group of users to which the first user belongs may be based upon one or more user parameter values of the first set of user parameter values. The one or more user parameter values upon which the selection of the group is based, may include user demographics. User demographics may include gender, age, location, weather, or any other identifying parameter for the user. The first set of user parameter values may include an indication of one or more collections of users to which the first user belongs. Collections of users may include in-game alliances, guilds or associations. Collections of users may include user whose in-game characters cohabitate a similar location within the game environment, have a particular character or user type, or users that have reached a particular hierarchy within the game. Collections of users may include users that have purchased above a threshold amount of virtual currency, or that have above a threshold amount of virtual currency in their inventories.

Individual ones of the one or more user parameter values may indicate that the first user, belongs to a particular alliance, guild, or association within the game, has electronic social media associations with one or more other users of the game, is affiliated with one or more real-world organizations, is located in a defined geographic region. Users may be selected for inclusion into the group of users to feature on the leaderboards based on their common association with the first user's in-game alliance, guild, or association, the first user's real-world organizations, geographic location, and/or is affiliated with the first user through one or more electronic social media.

It would be understood by one of ordinary skill in the art that the leaderboards may not be limited to the embodiment illustrated in FIG. 2.

Figure 3:
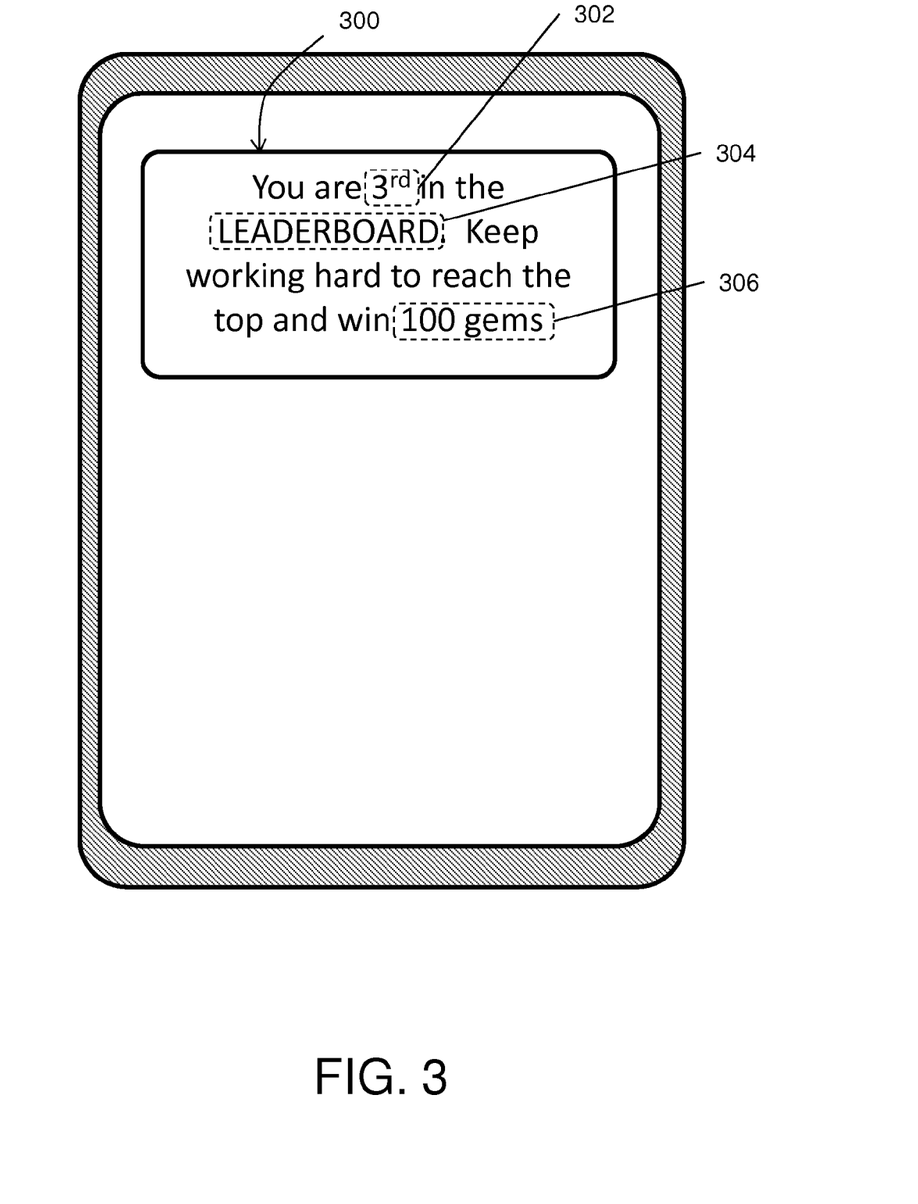
FIG. 3 illustrates a motivational message presented to a user, in accordance with one or more implementations.

The motivational module 118 may be configured to effectuate presentation to the first user of a motivational message, wherein the motivational message comprises an indication of the first set of game parameters or the first user. FIG. 3 illustrates a motivational message 300 presented to a user, in accordance with one or more implementations. The motivational message 300 may provide an indication 302 that the user is near to the top position or has a relatively high first set of game parameters compared to other users, and/or provide some other indication of the user's progress toward achieving the objective. The motivational message 300 may include an indication 304 of which leaderboard the motivational message 300 relates. The first user may presented with a first personalized leaderboard based upon a first set of game parameters and comprised of users based upon a first set of user parameters. The first user may be presented with one or more additional personalized leaderboards based upon one or more additional sets of game parameter values, comprised of users based upon one or more additional sets of user parameters. The motivational module 118 may be configured to effectuate presentation to the first user of one or more incentives 306 for achieving the top of the leaderboard 200, achieving a relatively high first set of game parameter values compared to the group of users, and/or for some other achievement.

Incentives may include one or more of virtual items, other amounts of virtual currency, access to areas in the game space that were previously not accessible to the first user, quests in the game space that were previously not available to the first user and/or other incentives to incentivize the first user to keep striving to achieve the objective, complete the activity or perform the action.

Figure 4:
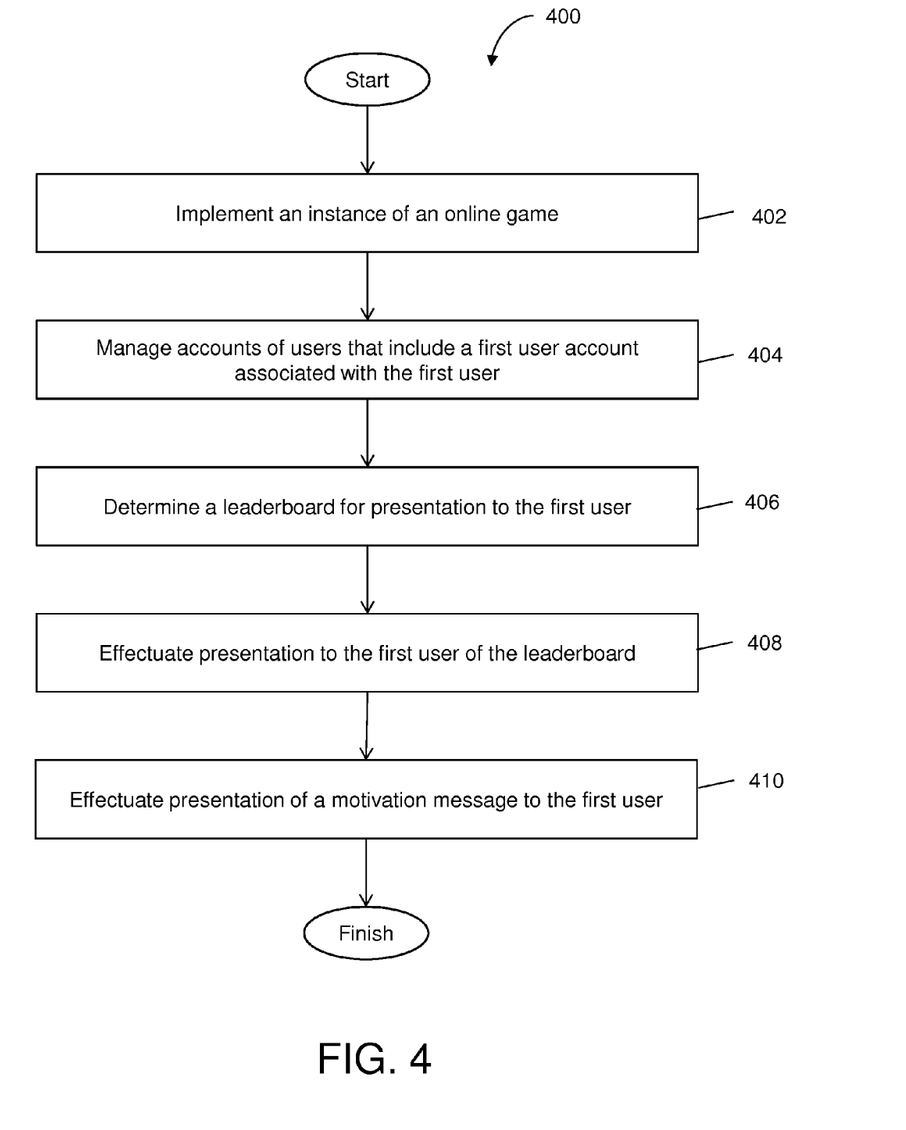
FIG. 4 illustrates a method for providing a personalized leaderboard to a user of a game, according to one or more implementations.

FIG. 4 illustrates a method for providing a personalized leaderboard to a user of a game, according to one or more implementations. The operations of method 400 presented below are intended to be illustrative. In some embodiments, method 400 may be accomplished with one or more additional operations not described, and/or without one or more of the operations discussed. The order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402 an instance of an online game to facilitate interaction of the users with the game may be implemented. The implemented online game may include an instance of a virtual environment having a 2-dimensional or 3-dimensional topography, and one or more objects within the topography. Users may interact with the topography and/ or the one or more objects within the topography. Operation 402 may be performed by a game module that is the same as or similar to game module 108, in accordance with one or more implementations.

At an operation 404 accounts of the users may be managed. The accounts of the users may include a first user account associated with a first user. The first user account may indicate a first set of user parameter values for the first user, and a first set of game parameter values for the first user, wherein the first set of user parameter values are representative of the first user, and wherein the first set of game parameter values characterize performance of the first user in the online game. Operation 404 may be performed by a user module that is the same as or similar to user module 110, in accordance with one or more implementations.

At an operation 406 a leaderboard for presentation to the first user may be determined. Such determination may include identifying a group of users (i) to which the first user belongs, and (ii) among which performance in the online game by the first user as characterized by the first set of game parameter values is relatively high. Operation 406 may be performed by a leaderboard determination module that is the same as or similar to leaderboard determination module 112, in accordance with one or more implementations.

The selection of the group of users to which the first user belongs may be based upon one or more user parameter values of the first set of user parameter values. The first set of user parameter values may include user demographics. The first set of user parameter values may include an indication of one or more collections of users to which the first user belongs. The group of users may be identified among which performance in the online game by the first user as characterized by the first set of game parameter values is greater than a determined threshold of success. The determined threshold of success may be a specified position below the most successful user in the group. The determined threshold may be the first user having a first set of game parameter values within a specified percentile within the first set of game parameter values for the user at the top of the leaderboard. The determined threshold may be the first user having a specified first set of game parameter values.

The group of users may be identified among which performance in the online game by the first user as characterized by one or more major game parameters of the first set of game parameters is relatively high. The one or more major game parameters may be determined based upon the first set of user parameters.

The group of users may be identified among which performance in the online game by the first user as characterized by one or more game parameters of the first set of game parameters is relatively high and may be less than at least one user of the identified group of users. Providing a leaderboard where the first user is close to, but not at, the top of the leaderboard incentivizes the user to continue playing the game to continue to progress toward the top of the leaderboard.

At an operation 408, presentation to the first user of the determined leaderboard may be effectuated. Operation 408 may be performed by a leaderboard presentation module that is the same as or similar to leaderboard presentation module 114, in accordance with one or more implementations.

At an operation 410, presentation to the first user of a motivational message may be effectuated. The motivational message may comprise an indication of the first set of game parameters. The motivational message may include an indication of the rank of the first user on the leaderboard. The motivational message may include one or more incentives available to the first user for reaching the top of the leaderboard, encouraging the first user to continue playing to continue to progress toward the top of the leaderboard and obtain the reward. Operation 410 may be performed by a motivational module that is the same as or similar to motivational module 116, in accordance with one or more implementations.

Figure 5:
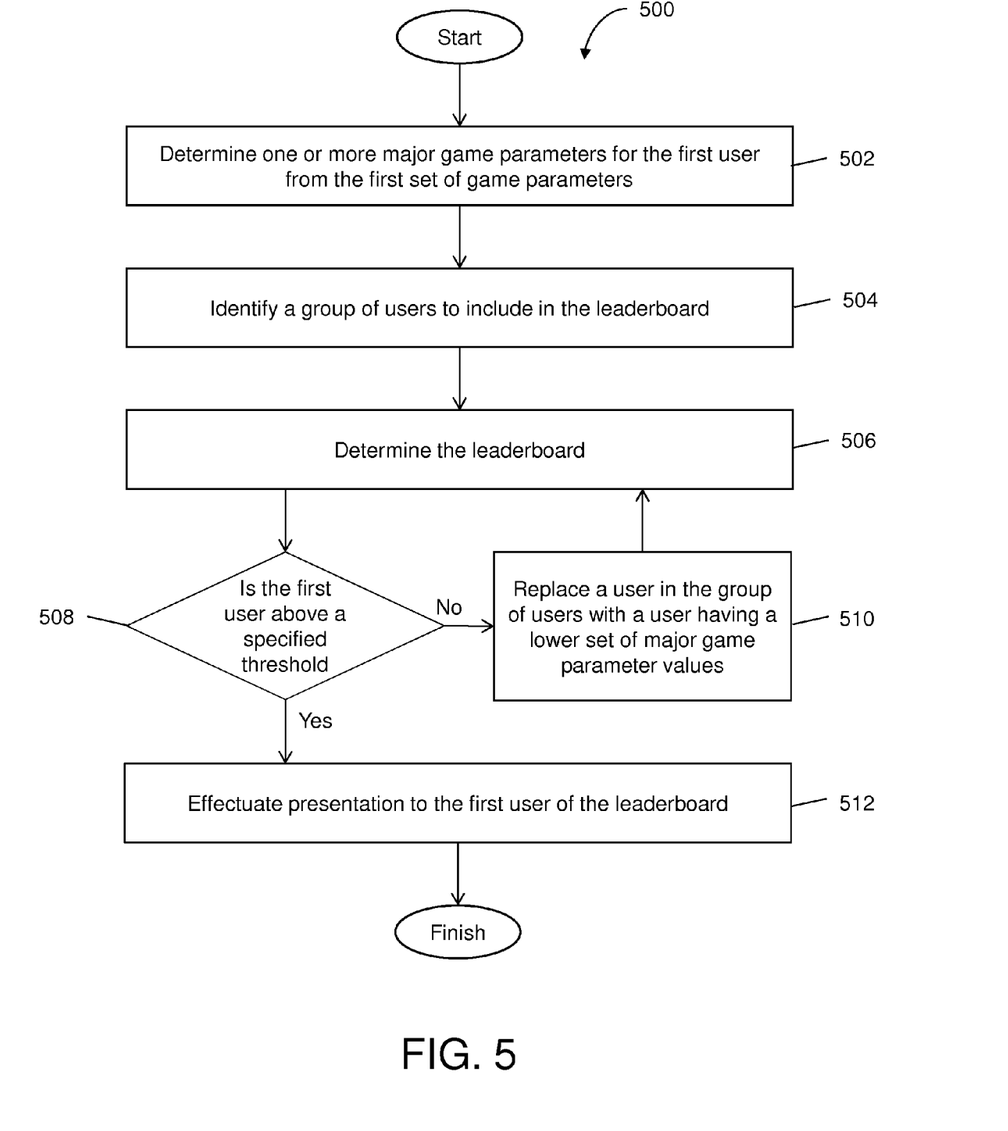
FIG. 5 illustrates a method for determining a personalized leaderboard based on one or more major game parameters, according to one or more implementations.

FIG. 5 illustrates a method for providing a personalized leaderboard to a user of a game, according to one or more implementations. The operations of method 500 presented below are intended to be illustrative. In some embodiments, method 500 may be accomplished with one or more additional operations not described, and/or without one or more of the operations discussed. The order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, one or more major game parameters for the first user from the first set of game parameters may be determined. The one or more major game parameters may be determined based upon the first set of user parameters for the first user. Operation 502 may be performed by a leaderboard determination module the same as, or similar to, leaderboard determination module 112.

Major game parameters may be game parameters defined by an administrator. For example, major game parameters may be defined as total experience points of the first user, the total might of the user, the total kills of the user, and/or other game parameters selected by the administrators. Major game parameters may be based on the user type. Where the user is a collection or harvesting type user, game parameters associated with collection and/or harvesting may be selected as major game parameters. Where the user is a player-versus-player type user, game parameters associated with player-versus-player activities, such as number of player-character kills, may be selected as major game parameters. Where the user is a player-versus-environment type payer, game parameters associated with player-versus-environment activities, such as total number of quests completed, may be selected as major game parameters.

Major game parameters may be determined based upon a user's game playing history. For example, the user account for the user may indicate that the user has a preference for hunting and for player-versus-player activities. One of more game parameters may be selected to be major game parameters for the user. Major game parameters may be selected that are associated with the purchase of in-game items using real currency. Leaderboards may be presented to the user featuring the user's relative success, compared to a group of users, based upon a major game parameter which may be improved by the purchase of virtual currency by the user. Game parameters effected by the purchase of virtual currency, may be the total amount of virtual currency purchased by the user, the total amount of virtual currency held by the user, the level of items held by the user that can only be purchased from a game shop.

At an operation 504, a group of users may be identified to which the first user belongs. The selection of the group of users to which the first user belongs may be based upon one or more user parameter values of the first set of user parameter values. The group of users may be identified among which performance in the online game by the first user as characterized by one or more major game parameters of the first set of game parameter values is greater than a determined threshold of success. Operation 504 may be performed by a leaderboard determination module the same as, or similar to, leaderboard determination module 112.

At an operation 506, a leaderboard may be determined for the first user based on the one or more determined major game parameters at an operation 502, and in response to identifying a group of users at an operation 504. Operation 504 may be performed by a leaderboard determination module the same as, or similar to, leaderboard determination module 112.

At an operation 508, a determination of whether the first user has a first set of game parameter values above a determined threshold of success may be made. The determined threshold of success may be a specified position below the most successful user in the group. The determined threshold may be the first user having one or more major game parameter values of a first set of game parameter values within a specified percentile within the first set of game parameter values for the user at the top of the leaderboard. The determined threshold may be the first user having a specified first set of game parameter values. Operation 508 may be performed by a leaderboard determination module the same as, or similar to, leaderboard determination module 112.

At an operation 510, in response to a determination, at operation 508, that the first user does not have one or more major game parameters values above the specified threshold of success for the identified group, a second group of users may be selected. In response to an indication that the first user failed to exceed a specified threshold of success, one user, of the identified group of users, may be replaced for another user determined to have one or more major game parameter values below the one or more game parameter values of the first user. In some implementations, the selection of the second group of users to which the first user belongs may be based upon one or more different user parameter values of the first set of user parameter values, compared to the previous group of users. Operation 510 may be performed by a leaderboard determination module the same as, or similar to, leaderboard determination module 112.

At an operation 512, in response to a determination, at operation 508, that the first user has one or more major game parameter values above the specified threshold of success for the identified group, presentation of the leaderboard, to the first user, may be effectuated. Operation 512 may be performed by a leaderboard presentation module the same as, or similar to, leaderboard presentation module 114.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing personalized leaderboards to users of a game, the system comprising:
    one or more processors configured to execute computer program modules, the computer program modules comprising:
        a game module configured to execute an instance of an online game, and to implement the instance to facilitate interaction of the users with the game;
        a user account module configured to manage accounts of the users that include a first user account associated with a first user and a second user account associated with a second user, wherein the first user account indicates a first set of user parameter values for the first user, and a first set of game parameter values for the first user, wherein the first set of user parameter values are representative of the first user, and wherein the first set of game parameter values characterize performance of the first user in the online game and the second user account indicates a second set of user parameter values for the second user and a second set of game parameter values for the second user, wherein the second set of game parameter values characterize performance of the second user in the online game;
        a leaderboard determination module configured to:
            determine a first leaderboard for presentation to the first user, wherein such determination includes identifying a first group of users (i) to which the first user belongs, and (ii) among which performance in the online game by the first user as characterized by the first set of game parameter values is relatively high; and,
            determine a second leaderboard for presentation to the second user, wherein such determination includes identifying a second group of users (i) to which the second user belongs, and (ii) among which performance in the online game by the second user as characterized by the second set of game parameter values is relatively high, wherein the second group of users is different from the first group of users; and
        a leaderboard presentation module configured to effectuate presentation to the first user of the first leaderboard determined by the leaderboard determination module and to effectuate presentation to the second user of the second leaderboard determined by the leaderboard determination module.

2. The system of claim 1, wherein the first group of users are identified among which performance in the online game by the first user as characterized by the first set of game parameter values is greater than a determined threshold of success.

3. The system of claim 2, wherein the determined threshold of success is a specified position below the most successful user in the first group.

4. The system of claim 1, wherein the first group of users are identified among which performance in the online game by the first user as characterized by one or more major game parameters of the first set of game parameters is relatively high.

5. The system of claim 4, wherein the one or more major game parameters is determined based upon the first set of user parameters.

6. The system of claim 1, wherein the selection of the first group of users to which the first user belongs is based upon one or more user parameter values of the first set of user parameter values.

7. The system of claim 6, wherein the first set of user parameter values include user demographics.

8. The system of claim 1 wherein the first set of user parameter values include an indication of one or more collections of users to which the first user belongs.

9. The system of claim 1, wherein the first user has a first set of game parameter values less than at least one user of the identified first group of users.

10. The system of claim 1, further comprising a motivational module configured to effectuate presentation to the first user of a motivational message, wherein the motivational message comprises an indication of the first set of game parameters.

11. A method for providing personalized leaderboards to users of a game implemented on a computer system that includes one or more physical processors, the method comprising:

executing an instance of an online game;

implementing the instance to facilitate interaction of the users with the game;

managing accounts of the users that include a first user account associated with a first user and a second user account associated with a second user, wherein the first user account indicates a first set of user parameter values for the first user, and a first set of game parameter values for the first user, wherein the first set of user parameter values are representative of the first user, and wherein the first set of game parameter values characterize performance of the first user in the online game and the second user account indicates a second set of user parameter values for the second user and a second set of game parameter values for the second user, wherein the second set of game parameter values characterize performance of the second user in the online game;

determining a first leaderboard for presentation to the first user, wherein such determination includes identifying a first group of users (i) to which the first user belongs, and (ii) among which performance in the online game by the first user as characterized by the first set of game parameter values is relatively high;

determining a second leaderboard for presentation to the second user, wherein such determination includes identifying a second group of users (i) to which the second user belongs, and (ii) among which performance in the online game by the second user as characterized by the second set of game parameter values is relatively high, wherein the second group of users is different from the first group of users;

effectuating presentation to the first user of the determined first leaderboard; and, effectuating presentation to the second user of the determined second leaderboard.

12. The method of claim 11, wherein the first group of users are identified among which performance in the online game by the first user as characterized by the first set of game parameter values is greater than a determined threshold of success.

13. The method of claim 12, wherein the determined threshold of success is a specified position below the most successful user in the first group.

14. The method of claim 11, wherein the first group of users are identified among which performance in the online game by the first user as characterized by one or more major game parameters of the first set of game parameters is relatively high.

15. The method of claim 14, wherein the one or more major game parameters is determined based upon the first set of user parameters.

16. The method of claim 11, wherein the selection of the first group of users to which the first user belongs is based upon one or more user parameter values of the first set of user parameter values.

17. The method of claim 16, wherein the first set of user parameter values include user demographics.

18. The method of claim 11 wherein the first set of user parameter values include an indication of one or more collections of users to which the first user belongs.

19. The method of claim 11, wherein the first user has a first set of game parameter values less than at least one user of the identified first group of users.

20. The method of claim 11, further comprising effectuating presentation to the first user of a motivational message, wherein the motivational message comprises an indication of the first set of game parameters.

* * * * *